US008579693B2

(12) United States Patent
Bennett, III et al.

(10) Patent No.: US 8,579,693 B2
(45) Date of Patent: *Nov. 12, 2013

(54) SYSTEM AND METHOD FOR IMPLEMENTING AN ADDITIONAL GAME TO PLAYERS OF A LOTTERY GAME

(75) Inventors: Joseph W. Bennett, III, Sugar Hill, GA (US); Jeffrey D. Martineck, Sr., Alpharetta, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,313

(22) Filed: May 9, 2012

(65) Prior Publication Data

US 2012/0225708 A1    Sep. 6, 2012

Related U.S. Application Data

(63) Continuation of application No. 11/842,207, filed on Aug. 21, 2007, now Pat. No. 8,197,323.

(60) Provisional application No. 60/839,049, filed on Aug. 21, 2006.

(51) Int. Cl.
*A63B 7/00* (2006.01)

(52) U.S. Cl.
USPC .................................. 463/17; 463/25; 463/29

(58) Field of Classification Search
USPC ................... 463/17, 25; 705/67, 72
See application file for complete search history.

(56) References Cited

U.S. PATENT DOCUMENTS

| | | | |
|---|---|---|---|
| 5,935,000 A | 8/1999 | Sanchez et al. |
| 6,251,017 B1 | 6/2001 | Leason et al. |
| 6,370,649 B1 | 4/2002 | Angelo |
| 6,497,408 B1 | 12/2002 | Walker et al. |
| 7,089,585 B1 | 8/2006 | Dharmarajan |
| 7,749,080 B2 | 7/2010 | Szrek et al. |
| 2002/0188845 A1 | 12/2002 | Henderson et al. |
| 2003/0200175 A1 | 10/2003 | Wang et al. |
| 2005/0262338 A1 | 11/2005 | Irwin, Jr. |
| 2006/0059363 A1 | 3/2006 | Mese et al. |
| 2009/0065574 A9 | 3/2009 | Behm et al. |

FOREIGN PATENT DOCUMENTS

| | | | |
|---|---|---|---|
| EP | 1422907 A | 5/2004 |
| WF | WO2004102353 A2 | 11/2004 |

OTHER PUBLICATIONS

International Search Report and Written Opinion for PCT/US2007/076370; May 8, 2008.

*Primary Examiner* — Lawrence Galka

(74) *Attorney, Agent, or Firm* — Dority & Manning, P.A.

(57) ABSTRACT

A system and method for providing an additional or end-of-game drawing to players of a lottery game is provided. In one embodiment, unique validation codes provided on lottery tickets can be encrypted using an algorithm and used to create a record of such encrypted codes. A player then participates in the lottery and subsequently submits the validation code from the ticket to a lottery provider. The lottery provider applies the algorithm to the submitted validation code to create another encryption code for comparison with the record of encrypted codes. In the event a match is found, the player is entered into a second-chance or end of game drawing. Upon entry, the player is no longer required to maintain possession of the ticket for subsequent validation.

20 Claims, 2 Drawing Sheets

SYSTEM AND METHOD FOR IMPLEMENTING AN ADDITIONAL GAME TO PLAYERS OF A LOTTERY GAME

PRIORITY CLAIM

The present application is a Continuation Application of U.S. application Ser. No. 11/842,207 filed Aug. 21, 2007, (issued as U.S. Pat. No. 8,197,323), which claims priority to, and all benefits of, a previously filed U.S. provisional application No. 60/839,049, entitled "System and Method for Implementing a Second Game to Non-Winning Players of a Lottery Game," filed on Aug. 21, 2006.

BACKGROUND OF THE INVENTION

Lottery ticket games are sometimes discontinued because tickets awarding the top prizes in the game have been sold out even though there may exist many tickets remaining in the game for sale. For example, in most instant lottery ticket games, a set of tickets is printed with play or prize value indicia under a scratch-off coating according to a predetermined prize structure. Typically, the prize structure consists of one or more large-value or 'top' prizes, a number of lesser value prizes and a large number of tickets that are not prize winners. The prize values in a game are imaged randomly on the tickets so that, in theory, each player has an equal chance to win one of the prizes.

In certain circumstances, however, problems have arisen as a game's tickets are sold and as the top prizes are claimed. There are, for instance, certain lottery administrations in the United States that post on their web sites the remaining prizes within a game. As the game is sold, the tickets having the various prizes are cashed, including the top prizes; and the lottery will update the website with the remaining prizes within the game. In some cases, the game will still have a significant number of tickets to be sold after the top prizes are cashed. This can lead to complaints from customers that it is no longer possible to win one of the top prizes as advertised by the lottery administration in its general promotional literature.

Accordingly, an invention is desired that provides a secure means by which players who participated in a first lottery game can also participate in a subsequent lottery game using the same lottery ticket as used in the first game. The invention is particularly advantageous for lottery games that would otherwise be discontinued due to the claiming of top prizes as set forth above. However, the present invention is not limited to discontinued games and concerns more generally a lottery game that allows a secure means by which one or more additional games can be played using the same lottery ticket and a means for ensuring that a player in subsequent games had a valid ticket without necessarily requiring such player to maintain possession of such ticket for purposes of claiming a prize.

SUMMARY OF THE INVENTION

Objects and advantages of the invention will be set forth in part in the following description, or may be obvious from the description, or may be learned through practice of the invention.

In general, the present invention provides for a system that manages a secure process that will encourage player interest throughout the duration of the game and in particular will guarantee that a top prize is, in fact, available to players from the beginning of the game to the end of the game. This system can be best described as a 'second chance draw'; and although there are many examples of lottery customers using second chance draws, the invention relates to the entire process as described below.

One objective of the present invention is to provide for the computer software, files and processes that will verify that a ticket entered into a draw does, in fact, meet the criteria established and is therefore a viable entry into a second chance draw.

Another objective of the invention is to provide for the computer software and processes that will securely enable a lottery ticket player to use the internet and thus enter a particular ticket into a game's draw.

Another objective of the invention is to provide for the computer software and processes that will securely enable a lottery ticket player to enter certain player identification so that after a ticket is drawn, the player can be contacted and notified of his winnings.

Yet another object of the invention is to provide for the computer software, systems and processes that will securely warehouse the ticket identification data and the player identification data.

It is still another object of the invention is to provide for the computer software, systems and processes that will securely enable a lottery administration to host an electronic end-of-game (or second-chance) draw.

One or more of the above objectives is met by exemplary methods of the present invention as will now be set forth in summary form. In one exemplary form, the present invention includes a method for implementing a second-chance game to players of a lottery game whereby tickets are provided for the lottery game and wherein the tickets are each assigned a unique validation code. For example, the validation code may be printed upon the ticket and covered with a coating that can be removed (e.g., scratched off) by the player. The validation code may be created as a unique, alphanumeric sequence. An algorithm is applied to generate a unique, first encryption code for each ticket validation code. The first encryption code is stored in a record. Tickets are distributed for possession by players of the lottery game. The players, such as non-winning players, are then allowed to submit the unique validation codes from their respective tickets for registration with, for example, the provider of the lottery.

The algorithm is also applied to the submitted validation codes to create a second encryption code for each submitted validation code. Various algorithms may be used with the present invention. In one method, the MD5 algorithm is used. However, other suitable algorithms may be used and are within the scope of the present invention.

The second encryption codes are compared with the record of first encryption codes to determine whether a match exists. A match provides reasonable assurance that the player has in his possession a ticket that is eligible for the second chance draw. Conversely, a non-match indicates that the player does not have an eligible ticket in his possession. For the validation codes submitted by players that result in matching encryption codes, such players are registered for the second-chance game. Player registration may be configured to include the recording of various identification information provided by the player so that the player may be contacted if he or she wins the second-chance game, for example. Where the validation code submitted by the player does not result in matching encryption codes, the validation code can be rejected and registration disallowed.

Submission of validation codes and player registration may be conducted, for example, by means of providing an internet accessible website. Various additional security precautions can be applied. For example, the website can be configured to lock out a player submitting more than a predetermined number (e.g., three) of validation codes that do not result in a matching encryption code. The player may be locked out indefinitely or for a predetermined amount of time. The validation code submitted by the player may also be used to determine whether such validation code has already resulted in a registration for the second-chance game.

In another exemplary form, the present invention includes a method for implementing an end of game drawing for a player of a lottery game. A record is stored that comprises a first encryption code that is created from applying an algorithm to a unique validation code assigned to a ticket provided to the player of the game. For example, this record may be stored by the lottery for later access. Once the player has acquired the ticket, the player can submit the validation code to which the same algorithm is also applied create a second encryption code. For example, the lottery provider may allow the player to enter the validation code through a website. The second encryption code is then compared with the record to determine whether a match exists between the second encryption code and the first encryption code. If so, the player can then be registered for the end of game drawing. Advantageously, having registered, the player is no longer required to maintain a ticket. If a match does not exist between the second encryption code and the first encryption code, then the player's attempt at registration can be rejected. Several variations as previously indicated and as further described below may also be applied to this exemplary method of the present invention as well.

These and other features, aspects and advantages of the present invention will become better understood with reference to the following description and appended claims. The accompanying drawings, which are incorporated in and constitute a part of this specification, illustrate methods of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference will now be made in detail to exemplary methods of the invention, one or more examples of which are illustrated in the figures. Each example is provided by way of explanation of the invention and not meant as a limitation of the invention. For example, features illustrated or described as part of one exemplary method can be used with another method to yield still a third method. It is intended that the present invention include these and other modifications and variations.

There are at least four aspects among various exemplary methods of the present invention's solution to the problem of cashing the top prizes before all of a game's tickets are sold.

First, exemplary method of the present invention include a secure mechanism to ensure that only qualified tickets are entered into the second-chance draw. The invention allows for the creation of a "hashed" or encrypted file of ticket information that allows a player to register qualified tickets into the draw.

Second, exemplary methods of the present invention include a reliable and secure method of player registration such that ticket entries can be related to a single player and, thus, the player can be notified in the event of that player winning the draw.

Third, exemplary methods of the present invention provide a reliable and secure method of entering or registering tickets (and thus a player's contact information) into the draw.

Finally, exemplary methods of the present invention provide a reliable and secure process of conducting the electronic, second-chance draw, such that one and only one valid ticket is drawn from the population of qualified entries; and that one and only one player is deemed the winner of the second-chance draw.

Figure 1:
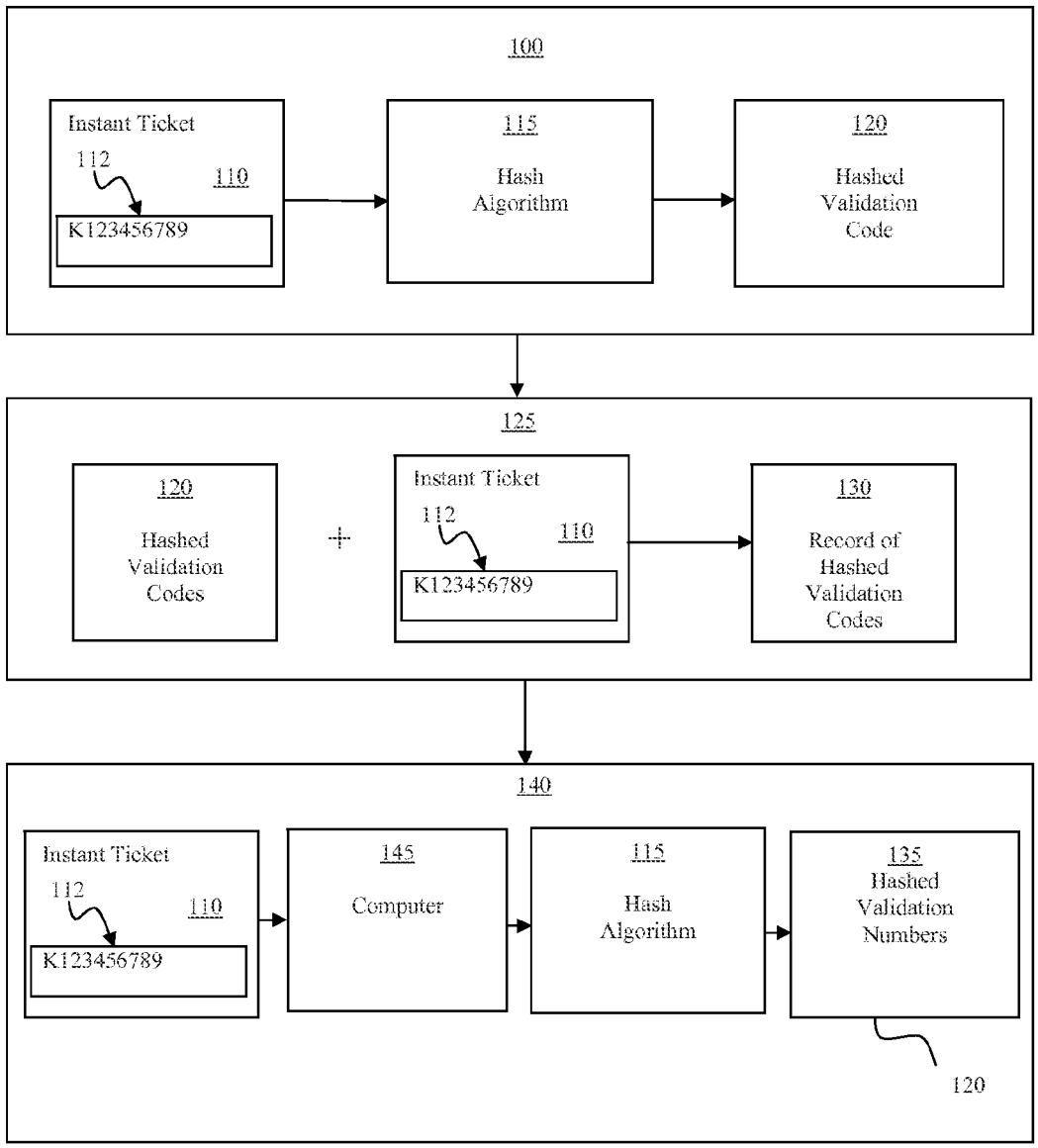
FIGS. 1 and 2 provide a flow chart illustration of an exemplary form of the present invention.
Figure 2:
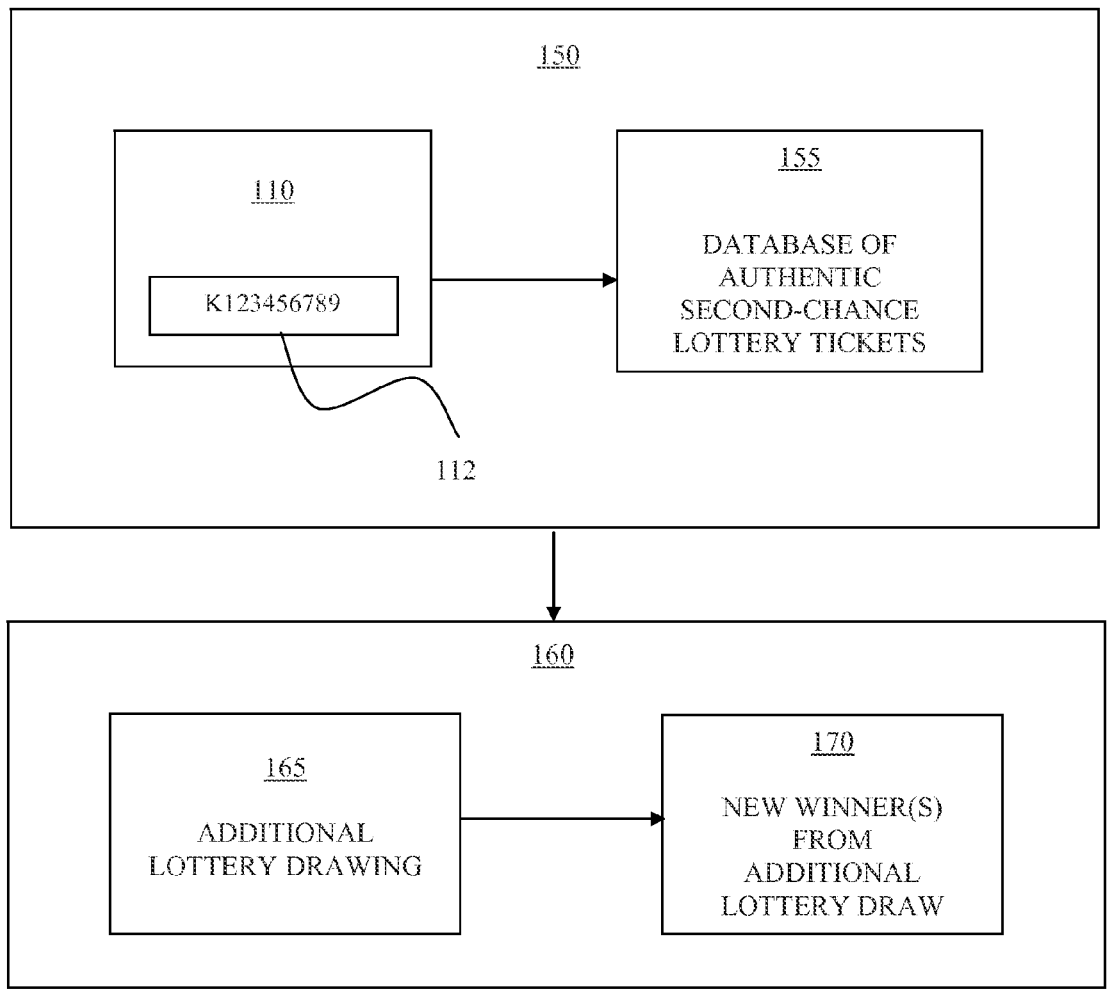

FIGS. 1 and 2 provide a flow chart illustration for describing an exemplary form of the present invention. Ticket 110 represents a lottery ticket to be transferred to a lottery provider such as a state agency operating a lottery. Before being transferred to the lottery provider, several steps take place to prepare for a secure means of conducting a second chance or end of game lottery using the same ticket 110. Initially, ticket 110 is printed with various indicia such as the name of the game, price of the ticket, and/or the identity of the lottery provider. Typically, the ticket may include a bar code and/or other identification data printed onto the ticket. By way of example, a scratch-off, instant-win game is also provided on the face of the ticket.

For this exemplary method of the invention, ticket 110 also includes a unique validation code 112 specific to a particular game being conducted by or for a particular lottery provider. Generally, for purposes of security, validation code 112 is covered by a removable coating intended for removal only by a player after purchasing ticket 110. Validation 112 code may, for example, comprise a sequence of alphanumeric characters that are randomly generated. A game identifier, prize amount, or other information may be associated with this validation code 112. For example, the sequence a player might see upon removing a scratch-off coating might be "K123456789." Numerous other variations may be employed.

Once the validation codes 112 have been generated, the numbers are encrypted. For example, one method of encryption is referred to as "hashing" based on the use of a hashing algorithm 115. Exemplary algorithms commonly available that may be suitable include the MD5 or SHA-1 algorithms. Regardless, as set forth in step 100, an algorithm 115 is used to convert the unique validation code 112 of each ticket into a hashed or encrypted validation code 120 (e.g., a first encryption code). More specifically, for each ticket, an open-source algorithm is applied that accepts as in input the validation code 112 that appears on a particular ticket and converts that code to provide as an output a new, unique code referred to as the hashed validation code or hash value of the code that was input from the face of ticket 110. The algorithm 115 always returns the same hash value output 120 each time the same validation code 112 is provided as an input. Some currently known algorithms may, however, provide what is referred to as "collisions." The MD5 algorithm, for example, will provide the same hash output literally each time the same validation code is provided as an input. However, the MD5 algorithm may provide the same output for two different inputs. Nevertheless, the probability that two different input codes will "hash" to the same output is considered to be statistically insignificant. In addition, safeguards against having duplicate hashed codes in a particular game are avoided by simply examining all of the hashed numbers 120 generated for a particular game to see if any duplicates were in fact generated.

For example, this inspection could be performed rapidly by a subroutine programmed into software that includes the algorithm 115.

Along with a record (e.g., electronic file) of the hashed validation codes 120, tickets 110 with unique validation numbers 112 are transferred to a lottery provider who stores the record of hashed validation numbers 130 as illustrated schematically in step 125 of FIG. 1. Where the transfer of hashed validation numbers is accomplished electronically, various methods may be used to provide for a secure transfer. For example, the transfer of an electronic file containing the hashed validation numbers may utilize a pgp file encryption process that makes use of a confidential key for accessing the file. One of skill in the art will understand, using the teachings disclosed herein, that other suitable secure transfer methods may also be utilized.

Tickets 110 are eventually provided to players by, for example, purchase at retail establishment. Typically, the player then takes part in a lottery game referred to herein as the first lottery game. The present invention is not limited to any particular type of lottery game and one of skill in the art, using the teachings disclosed herein, will recognize that numerous game types may be used. For example, multiple types of scratch-off lottery games using instant tickets could be applied with the present invention. More than one game could be applied to the same ticket as well.

Regardless, for this exemplary method of the present invention, once the player has taken part in the game available on the ticket, an additional game is made available. More specifically, should the player not win a prize in the first lottery game, according to this exemplary form of the present invention, the player may then register the validation code 112 into the lottery provider's database as shown in step 140. For example, the player may use his or her home computer 145 to access the lottery provider's website on the internet and thereby enter the unique validation code 112 from the face of the ticket 110 into the provider's system. Then, using the same algorithm 115 previously utilized to create the hashed validation codes 120 originally as in step 100, the lottery provider hashes the validation code 112 as entered by the player. The resulting hash code 135 (e.g., a second encryption code) is then compared with the previously created record of hashed codes 130 for this particular lottery game.

If the same, i.e., a matching, hashed validation code 120 (i.e., the first encryption code) is found in the record 130 previously created in step 100, the lottery provider is then assured that the player has a valid ticket 110. If a match is not found, the entry is rejected. If a match is found, but the match corresponds to a previously registered ticket, the entry is rejected. Several additional measures can be undertaken to increase the accuracy of the validation process of step 140. For example, to discourage players from attempting to enter non-authentic validation codes, the lottery provider's website can include a lock-out feature that blocks any player who attempts more than a predetermined number of times (e.g., three) to enter a validation code that is not authentic. The lock-out can be permanent or only for a predetermined time period.

At the same time the player registers ticket 110, the player can also be prompted to provide additional identifying information such as name, address, telephone number, and/or email address. By providing this information from a valid ticket 110, this exemplary method of the present invention allows the player the convenience of discarding (or perhaps losing) the actual ticket 110 once the ticket has been registered and validated by the lottery provider's website. The lottery provider can simply contact the player directly should the ticket 110 prove to be a winner in a subsequent drawing. Furthermore, the lottery provider may also catalog this information for use in advertising or contacting the player for other purposes.

Regardless, as illustrated in step 150, once the lottery provider validates the ticket by finding a matching hash number that was not previously submitted, the ticket is registered into a database or other record 155 and the player is now eligible for a lottery drawing, which may be referred to herein as a second chance drawing or end of game draw. Accordingly, the player is provided with another chance to win playing the lottery game using the same ticket 110. Furthermore, even if winners have already been announced for the first or previous lottery drawings in the lottery game and perhaps at a time before all tickets printed for the game have been sold, the lottery provider should still be able to sell remaining tickets because players still have an opportunity to win in a second chance or end of game drawing. Additionally, by controlling the content of the record or database of hashed numbers, the lottery provider can ensure that only players who did not win in the first or previous lottery are eligible for any subsequent or end of game lottery. For example, the lottery provider may allow the database of hashed numbers to be created only from tickets that did not create winners in the first lottery. Alternatively, as desired, the lottery provider may allow all players, including winners from the first lottery, to participate in a subsequent or end of game lottery. Either way, using the validated ticket entries, the lottery provider conducts a second or end of game drawing 165 as shown in step 160 to create one or more additional winners 170.

Although preferred methods of the invention have been disclosed in the foregoing specification, it is understood by those skilled in the art that many modifications and other methods of the invention will come to mind to which the invention pertains, having the benefit of the teaching presented in the foregoing description and associated drawings. Moreover, although specific terms are employed herein, they are used in a generic and descriptive sense only, and not for the purposes of limiting the described invention.

What is claimed is:

1. A computer-implemented method for providing an additional lottery game to players of a ticket-based lottery game, comprising the steps of:

producing tickets for the ticket-based lottery game, including printing a unique validation code on each ticket;

with a computer system, applying an algorithm to generate a unique, first encryption code for each ticket validation code;

storing the first encryption code in a computer system so that the first encryption code and algorithm are present only as electronic data in the computer system and the tickets are free of the first encryption code and algorithm;

distributing the tickets for possession by players of the ticket-based lottery games;

providing for players to submit the unique validation code for registration in the additional lottery game;

the computer system applying the algorithm to each unique validation code submitted by a player to create a second encryption code for each unique validation code submitted by a player;

the computer system comparing the second encryption code with a record of the first encryption codes to determine whether a match exists between the second encryption code and one of the first encryption codes; and registering players for the additional lottery game when the unique validation code submitted by such players results in the match between the second encryption code and one of the first encryption codes.

2. The method for providing an additional lottery game as in claim 1, wherein said step of providing for players to submit the unique validation code comprises providing a website accessible over the internet by which players may provide the unique validation code from the ticket.

3. The method for providing an additional lottery game as in claim 2, wherein the website locks out a player after multiple attempts to submit unique validation codes that do not result in a match between the second encryption code and one of the first encryption codes.

4. The method for providing an additional lottery game as in claim 2, wherein for a predetermined period of time the website locks out a player after multiple attempts to submit unique validation codes that do not result in a match between the second encryption code and one of the first encryption codes.

5. The method for providing an additional lottery game as in claim 1, wherein said registering step comprises recording identification information provided by the player.

6. The method for providing an additional lottery game as in claim 1, further comprising the step of rejecting a code submitted as a unique validation code where there is no match between the second encryption code and the record of first encryption codes.

7. The method for providing an additional lottery game as in claim 1, wherein said comparing step further comprises determining whether a unique validation code that results in a matching first and second encryption code has already been submitted.

8. The method for providing an additional lottery game as in claim 1, wherein the ticket-based lottery game is an instant-win scratch-off game implemented on the ticket and the unique validation code on the ticket is printed under a coating on the instant-win scratch-off ticket that is removable by a player.

9. The method for providing an additional lottery game as in claim 1, wherein the algorithm is the MD5 algorithm.

10. The method for providing an additional lottery game as in claim 1, wherein the algorithm provides the same unique encryption code for each entry of a particular unique validation code.

11. The method for providing an additional lottery game as in claim 1, wherein the unique validation code is an alphanumeric code.

12. A computer-implemented method for providing an Internet accessible lottery game to players that purchase a lottery ticket from a retail establishment, comprising the steps of:
producing lottery tickets for sale at the retail establishment, including printing a unique validation code on each ticket;
with a computer system, applying an algorithm to generate a unique, first encryption code for each unique validation code;
storing the first encryption code in a computer system so that the first encryption code and algorithm are present only as electronic data in the computer system and the tickets are free of the first encryption code and algorithm;
providing for players to submit the unique validation code via a website for registration in the lottery game;
the computer system applying the algorithm to the unique validation code submitted by the player to create a second encryption code for each unique validation code submitted by the players;
the computer system comparing the second encryption code with a record of first encryption codes to determine whether a match exists between the second encryption code and one of the first encryption codes; and
registering players for the lottery game when the unique validation code submitted by such players results in the match between the second encryption code and one of the first encryption codes.

13. The method for providing an Internet accessible lottery game as in claim 12, wherein the lottery ticket also includes an instant-win scratch-off lottery game implemented on the ticket.

14. The method for providing an Internet accessible lottery game as in claim 13, wherein the unique validation code on the ticket is printed under a coating on the instant-win scratch-off ticket that is removable by a player.

15. The method for providing an Internet accessible lottery game as in claim 12, wherein the website locks out a player after multiple attempts to submit unique validation codes that do not result in a match between the second encryption code and one of the first encryption codes.

16. The method for providing an Internet accessible lottery game as in claim 15, wherein the player is locked out for a predetermined period of time after multiple attempts to submit unique validation codes that do not result in a match between the second encryption code and one of the first encryption codes.

17. The method for providing an Internet accessible lottery game as in claim 12, wherein said registering step comprises recording identification information provided by the player.

18. The method for providing an Internet accessible lottery game as in claim 12, further comprising the step of rejecting a code submitted as a unique validation code where there is no match between the second encryption code and the record of first encryption codes.

19. The method for providing an Internet accessible lottery game as in claim 12, wherein said comparing step further comprises determining whether a unique validation code that results in a matching first and second encryption code has already been submitted.

20. The method for providing an Internet accessible lottery game as in claim 12, wherein the algorithm provides the same unique encryption code for each entry of a particular unique validation code.

* * * * *